United States Patent [19]

Kephart et al.

[11] Patent Number: 5,613,002

[45] Date of Patent: Mar. 18, 1997

[54] GENERIC DISINFECTION OF PROGRAMS INFECTED WITH A COMPUTER VIRUS

[75] Inventors: Jeffrey O. Kephart, Yorktown Heights; Gregory B. Sorkin, New York, both of N.Y.

[73] Assignee: International Business Machines Corporation, Armonk, N.Y.

[21] Appl. No.: 342,520

[22] Filed: Nov. 21, 1994

[51] Int. Cl.⁶ .............................. H04L 9/00; H04K 1/00
[52] U.S. Cl. ...................... 380/4; 395/186; 395/187.01; 395/188.01; 395/183.12; 395/183.14; 395/183.15; 364/285.4; 364/286.4; 380/25
[58] Field of Search .............................. 380/2, 4, 30, 49, 380/9, 44, 46, 25; 395/183.15, 575, 600, 700, 186, 187.01, 188.01, 183.14, 183.12; 364/285.4, 286.4

[56] References Cited

U.S. PATENT DOCUMENTS

| | | | |
|---|---|---|---|
| 5,050,212 | 9/1991 | Dyson | 380/25 |
| 5,349,655 | 9/1994 | Mann | 395/575 |
| 5,367,682 | 11/1994 | Chang | 395/700 |
| 5,408,642 | 4/1995 | Mann | 395/575 |
| 5,442,699 | 8/1995 | Arnold et al. | 380/4 |
| 5,473,769 | 12/1995 | Cozza | 395/183.15 |
| 5,475,625 | 12/1995 | Glaschick | 395/600 |
| 5,485,575 | 1/1996 | Chess et al. | 395/183.14 |

OTHER PUBLICATIONS

"Calculating CRC's By Bits and Bytes" Sep. 1986 pp. 115–124 Bytes Magazine, Greg Morse.
"Virus Verification and Removal—Tools and Techniques" Virus Bulletin Nov. 1991 UK pp. 7–11 D. M. Chess.

*Primary Examiner*—Thomas H. Tarcza
*Assistant Examiner*—Hrayr A. Sayadian
*Attorney, Agent, or Firm*—Robert P. Tassinari, Jr.

[57] ABSTRACT

A method for restoring a computer program infected with a computer virus to its non-viral condition. The method uses certain information about an uninfected host program recorded prior to infection without relying upon pre-existing knowledge of the computer virus. The method includes: recording a checksum of the uninfected original program, the length of the program, and information pertaining to bytes located near the beginning and end of the original program; and, subsequent to any modification of the original program that is deemed suspicious, generating one or more trial reconstructions based on the recorded information and information contained in the modified file; comparing a checksum of each generated trial reconstruction with the checksum of the original program stored in the database; and outputting a trial reconstruction as the original uninfected program if its checksum matches that of the original program.

34 Claims, 8 Drawing Sheets

APPENDING VIRUS

PREPENDING VIRUS

OVERWRITING VIRUS

MODIFIED OVERWRITING VIRUS

MORE COMPLICATED MODIFIED
OVERWRITING VIRUS

FIG. 5

| HEADER | | | | | | | | | | | | |
|---|---|---|---|---|---|---|---|---|---|---|---|---|
| 00 | 00 | 00 | 00 | 00 | 00 | 00 | 00 | 00 | 00 | 00 | 00 | 00 |
| 00 | 00 | BEGIN TAG | | | | 21 | 2E | 8B | 1E | 9C | | |
| 00 | 00 | 00 | 00 | | | | | | | | | |
| 02 | 2E | 8A | 07 | 8B | DA | B9 | 02 | 00 | B6 | 00 | CD | 26 | 2E | 8B | 1E |
| 54 | 00 | 58 | 05 | 54 | 00 | 75 | 05 | 54 | 00 | 7A | 05 | 54 | 00 | 8E | 05 |
| 54 | 00 | 9D | 05 | 54 | 00 | B1 | 05 | 54 | 00 | C2 | 05 | 54 | 00 | D6 | 06 |
| 9C | 02 | 4B | 2E | 89 | END TAG | 1A | 1A | 1A | 1A |

FIG. 6

GENERIC DISINFECTION OF PROGRAMS INFECTED WITH A COMPUTER VIRUS

FIELD OF THE INVENTION

The present invention relates to disinfection of programs that have been infected with a known or previously unknown computer virus.

BACKGROUND OF THE INVENTION

There are two basic ways to clean up a computer virus infection: erase the infected file and replace it with a backup, uninfected version; or disinfect it. The second option is usually preferred by users because it is easier, and does not rely on the prior existence of a backup copy of the program.

The following description of how viruses typically infect host programs helps to explain why and how it is usually possible to disinfect infected programs. Unlike biological viruses, which typically destroy their host cells, computer viruses have a vested interest in preserving the function of their host programs. Any computer virus that causes its host to malfunction would be likely to arouse a user's suspicion and thus bring about its own untimely demise. By far the easiest way for a virus author to ensure this, and the only way used in practice, is to keep the original code intact and add the virus code to it. More specifically, it is almost universal to have the virus code execute first, then pass control back to the victim program. (Because the victim code might terminate in a variety of places under a variety of conditions, it is more difficult to design a virus that runs after the victim runs, and we know of no cases where this has been done.) For this reason, an infected program usually contains the entire contents of the original file in some form. Almost universally, the infected program contains large contiguous blocks of code from the original host (perhaps with some rearrangement of the original order), interspersed with blocks of virus code. Some pieces of the original host may not appear explicitly, but be encrypted and stored in data regions of the virus.

Several typical virus infection patterns are illustrated in FIG. 1. Appending viruses (FIG. 1a) add themselves to the end of the host, and modify the header of the original host so as to cause execution to begin within the virus rather than the host. A jump instruction at the end of the virus returns control to the host when the virus has finished execution. Prepending viruses (FIG. 1b) add themselves to the beginning of the host. Standard overwriting viruses (FIG. 1c) overwrite a portion of the host, and modify the header of the host so as to cause execution to begin inside the virus. Unless the virus happens to write itself into an unused portion of the host (such as an unused data region), the host is likely to suffer permanent, irreversible damage. Modified overwriting viruses such as those illustrated in FIGS. 1d and 1e copy a region of bytes equal in length to the virus to the end of the host, and then overwrite the beginning of the host. An additional virus region may intervene between the two sections of the original host. The examples of virus attachment patterns presented in FIG. 1 are illustrative, but not exhaustive.

Another important observation is that almost all viruses intersperse host and virus code very consistently, independent of the host, the operating environment, the virus's generation, etc.

Given these characteristics of typical viral infections, it is apparent that, in order to disinfect an infected program, one simply needs to know the locations of the pieces of the original host and how they ought to be joined to form the original. Additionally, in cases where portions of the host are imbedded or encrypted in the virus, it is necessary to reconstruct those bytes—either by knowing how the virus transforms and imbeds them, or by retrieving them from a database created prior to the infection of the host.

There are two known strategies for disinfecting infected programs. The most common technique is to detect the presence of a known virus in a program, and then to use specific knowledge about how that virus modifies its victims to undo that transformation. Typically, both the means for detecting and removing a given known virus are derived by a human expert; recent technological advances have made substantial progress towards automating both of these procedures.

A second strategy, referred to herein as "generic disinfection", is to record a small amount of information about each host program in a database, and to use this information to reconstruct the original program. The advantage of generic disinfection is that this method of disinfection does not rely on specific knowledge about a large number of viruses. This is particularly important For handling new viruses that have not yet been analyzed, or for which anti-virus updates have not yet been issued or installed widely by users. The disadvantage is that programs cannot be disinfected until the database has been established, i.e., viruses that were present in the system prior to the construction of the database cannot be removed by this method. Virus-specific and generic disinfection methods can be combined so as to benefit from the advantages of each.

A few implementations of generic disinfection exist, but all suffer from a lack of generality both in terms of the class of viruses they can remove and their specificity to one particular operating system. Previous schemes for generic disinfection consist of an ad hoc collection of methods, each tailored to a specific pattern of a virus's attachment to its host; some even fail to check whether the repair has been successful, and can result in damage to the host file.

This invention is a more general method for generically disinfecting host programs, applicable to nearly all existing viruses that preserve the function of their host. In some cases, it is even able to disinfect hosts that have had large portions overwritten by a virus-a situation that was previously regarded as completely hopeless. Furthermore, except for the choice of the value of a few parameters, the method does not depend in any fundamental way on the details of the operating system. Unlike some existing methods, the invention is extremely unlikely to perform an erroneous disinfection: it will either disinfect an infected host correctly, or leave it untouched.

SUMMARY OF THE INVENTION

The present invention is a method of recording certain information about a computer program, and for using that information to reconstruct the program in the event that it subsequently becomes infected with any of a very broad class of viruses.

The method includes constructing a database with entries for each program to be protected. It further includes a fast trial-and-error method for reconstructing the original uninfected host based on cyclical redundancy checks (CRC's), or a broader class of linear modular-arithmetic mappings.

The central observation on which the method is founded is that, for virtually every known virus, the infected host contains no more than two contiguous blocks of code taken from the original uninfected host (and possibly reversed in order). Prior to infection, a "checksum" (a many-to-one mapping of the bytes comprising the uninfected host to a small number of bits or bytes) is computed. In addition, information pertaining to bytes near the beginning and end of the host is computed (designated BeginTag and EndTag, respectively). Furthermore, the length of the host is determined. The checksum, BeginTag, EndTag and filelength are recorded in a data base containing one or more such entries, one for each host.

If it is subsequently determined that the program has changed in a suspicious manner, a reconstruction of the original host can be attempted as follows. A first step searches through the modified host for the BeginTag and EndTag. A putative location for the beginning of the original host within the modified host, designated BeginOffset, is computed for each BeginTag that is found. A putative location for the end of the original host within the modified host, designated EndOffset, is computed for each EndTag that is found. If at least one BeginTag and one EndTag are found, a second step attempts to find a block BeginSection of contiguous bytes beginning at the offset BeginOffset in the modified host and a block EndSection of contiguous bytes ending at offset EndOffset in the modified host, such that the byte sequence TrialReconstruction formed by concatenating the sequence BeginSection with the sequence EndSection has length and checksum equal to that of the original host. If TrialReconstruction satisfies these criteria, it is almost certain to be identical to the original host, and it is output as the disinfected host. If several BeginTags or EndTags are found, the preceding method is applied to each possible pair of such tags, until the correct checksum of the original host is obtained or all pairs have been exhausted.

The checksum that is to be applied to the entire host ought to satisfy the following criteria:

1. Cryptographically secure

Even if a virus is aware of the original checksum and the method by which it was computed, it should be difficult for the virus to add itself to the host program without changing the checksum. The level of cryptographic security required is moderately high, but not as high as one might require for other applications such as secure communication of sensitive data. This is because, at least in today's most popular operating environments, viruses cannot use very much computational resource without drawing attention to themselves.

2. Good hash function

The likelihood for two randomly chosen files to possess the same checksum ought to be extremely small. One way to ensure this is for the checksum to have a large number of equi-probable values. Furthermore, the checksums should be extremely sensitive to differences between two files, even those as small as a single bit at any given position.

3. Easy to compute

The checksum should involve as few machine instructions per byte as possible, so that creation of the database, and updates to it, can be computed in a reasonable amount of time.

4. Easy to re-use

An important practical issue arises during the trial-and-error reconstruction. The number of trials that must be made can be nearly as large as the number of bytes in the original host, FileLength. In the course of each trial, a checksum involving FileLength bytes must be computed. Thus the trial-and-error method could entail the processing of approximately FileLength$^2$ bytes—about a trillion for large DOS programs. No matter how trivial the computation per byte, this could take several days on a typical DOS machine. A key feature of this invention is the use of checksums having the property that, if byte strings $s_1$ and $s_2$ are closely related, and the checksum of $s_1$ is known, the checksum of $s_2$ may be obtained via a simple computation that is independent of the length of $s_1$ and $s_2$. This enables the amount of computation involved in the trial-and-error method to scale linearly rather than quadratically with the length of the original host, which makes the method quite practical.

Note that the first criterion is somewhat at odds with the last two. A very easy, reusable checksum would simply be to XOR all the bytes of the file together. However, a virus could easily forge this checksum by reserving a special data byte. First, it could carry out its infection in the normal way, setting the value of the data byte to 0. Then, it could compute the checksum of the infected file, XOR it with the checksum of the original file, and replace the data byte with this value. The resulting infected file would have the same checksum as the original. At the other extreme, a very strong encryption method such as DES is very secure, but completely non-reusable. Cyclical redundancy checks (CRC's) strike a good balance among these various criteria, and will be described further in the detailed description of the invention. If checksums are used to compute BeginTag and EndTag, security is not so much of an issue, but the computability and re-usability criteria remain important.

In one embodiment of the invention, the generic disinfection method is used to restore infected programs to their original uninfected state. In another embodiment of the invention, the generic disinfection method is used as a heuristic to help determine whether modifications that have been made to a program are likely to be viral in nature.

FIGURES

FIGS. 1(a)–(e) shows some typical virus attachment patterns.

FIGS. 2(a)–(b) is a flowchart of the method of the present invention.

FIG. 5 shows the process of selecting the bytes from which BeginTag and EndTag are computed in one preferred embodiment of the invention.

FIG. 6 shows successive trial reconstructions for overwriting viruses.

DETAILED DESCRIPTION

Figure 1A:
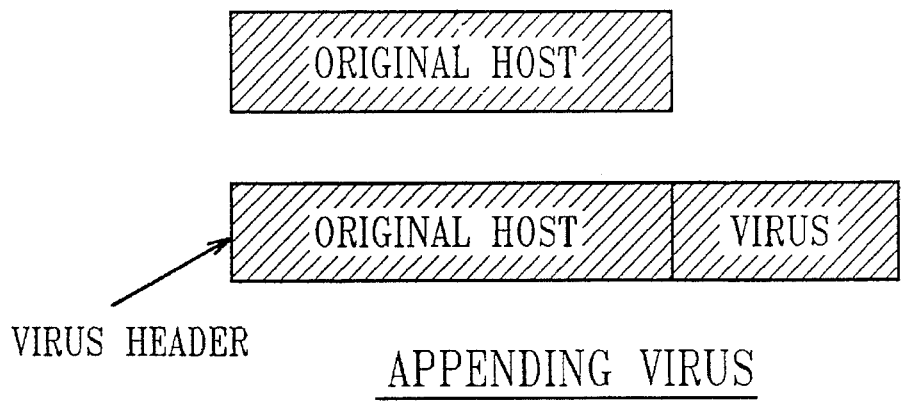
Figure 1B:
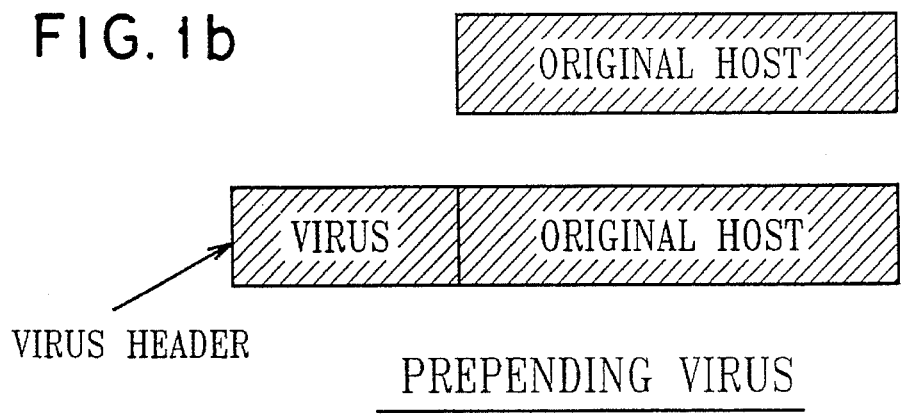
Figure 1C:
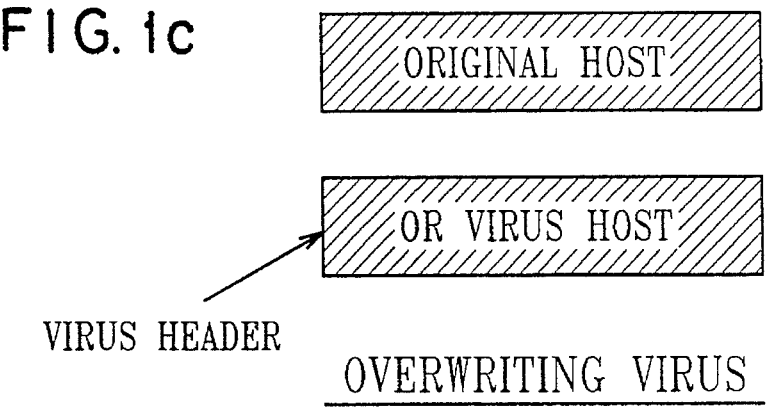
Figure 1D:
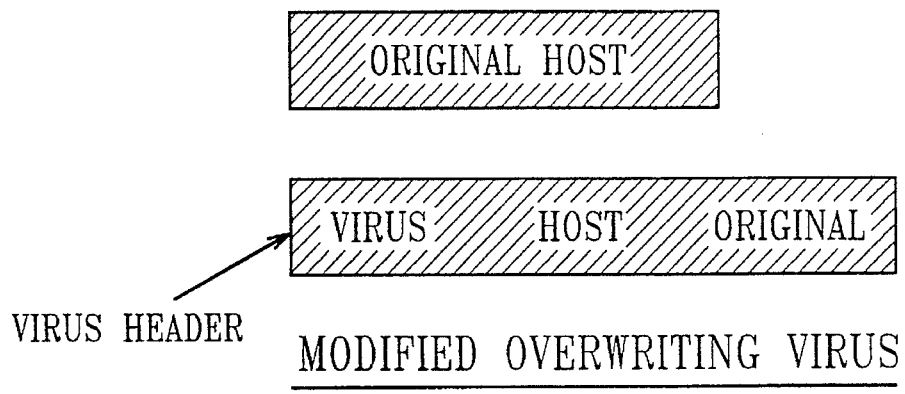
Figure 1E:
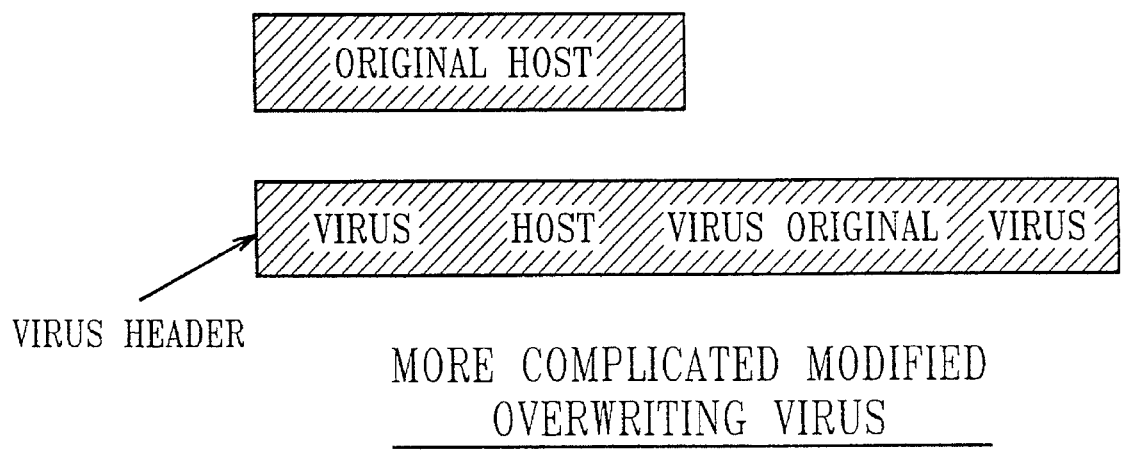
Figure 2A:
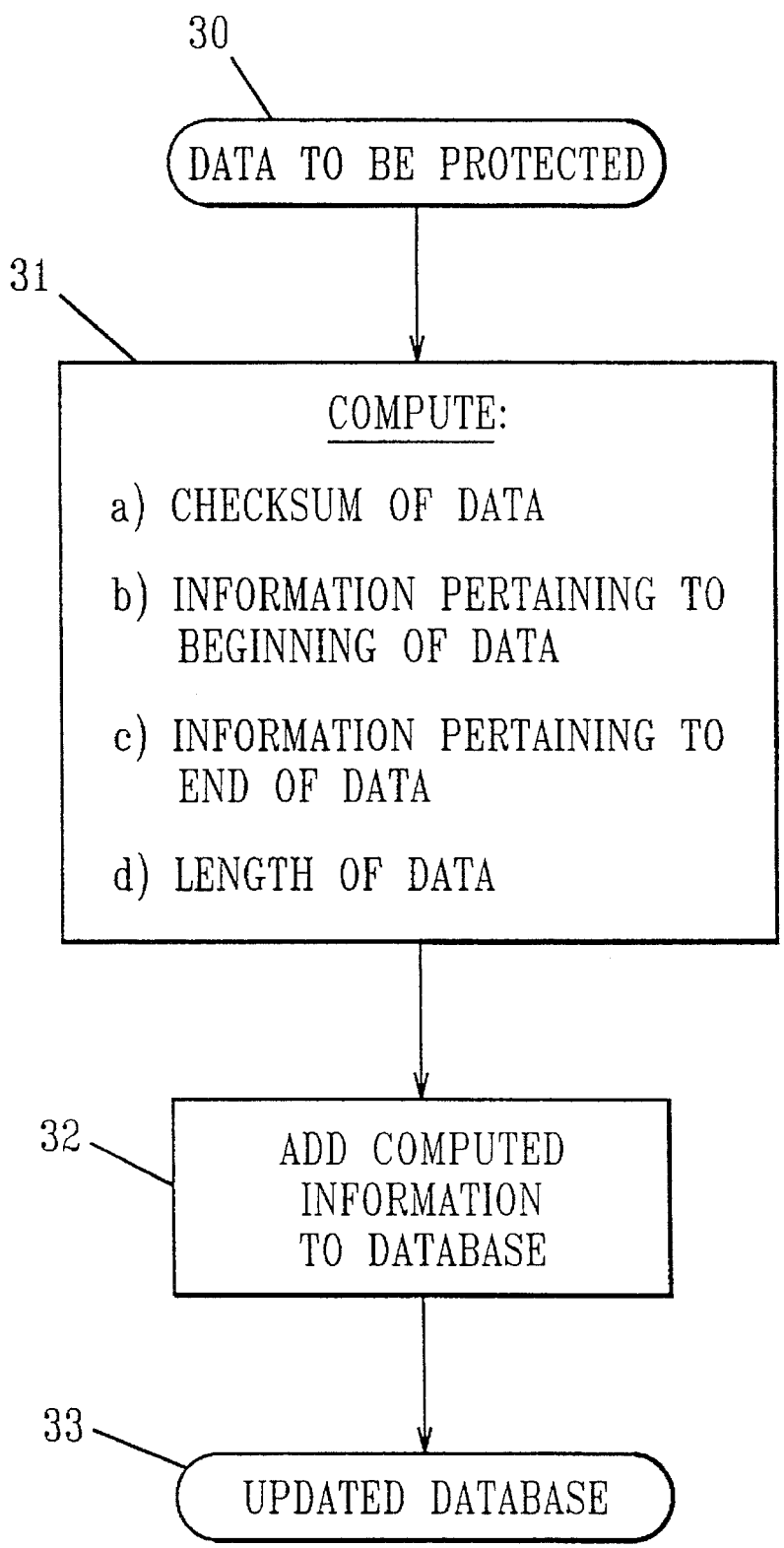
Figure 2B:
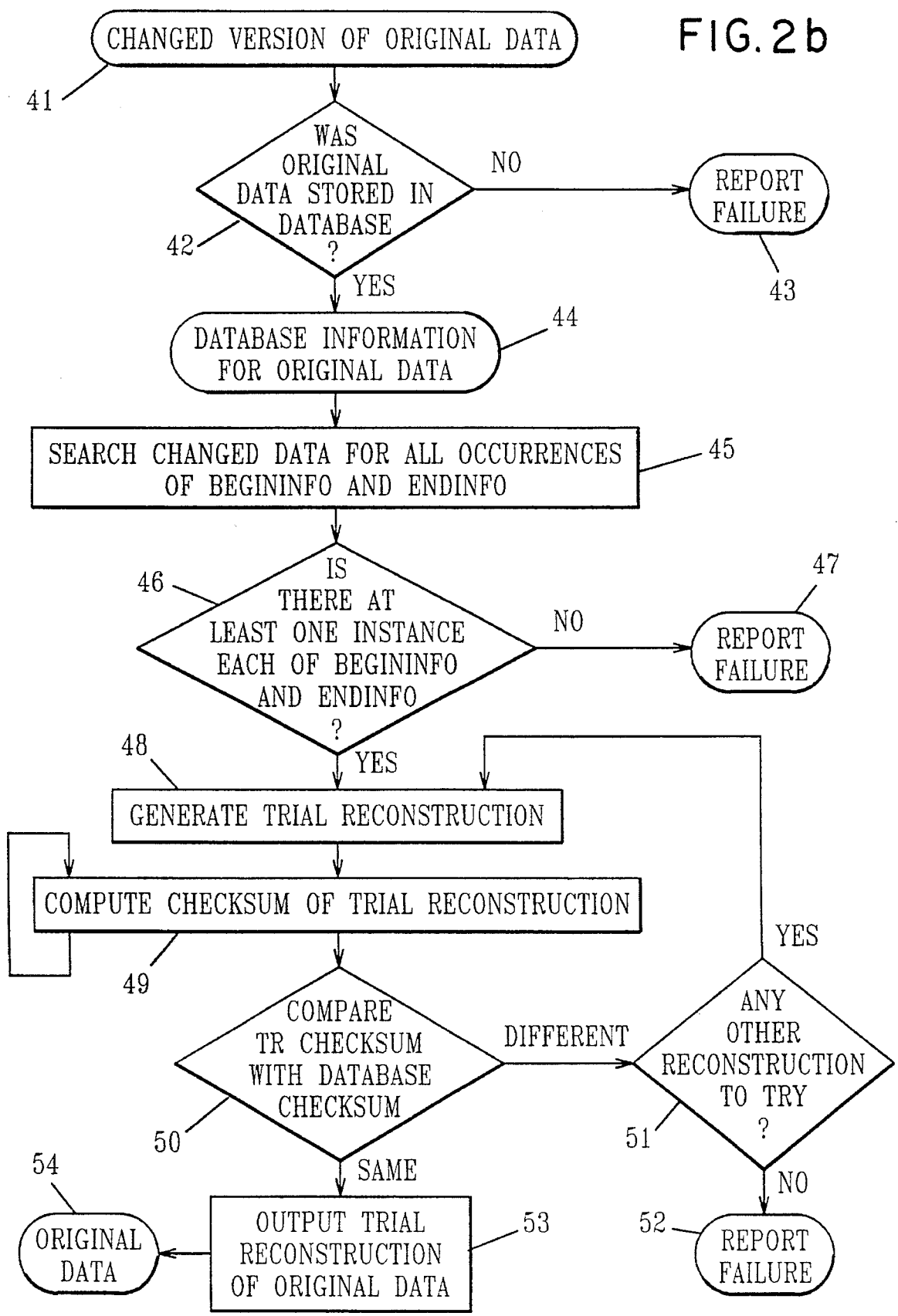

The process according to the invention will now be described by way of a specific example shown in FIG. 2. More particularly, FIG. 2a shows a flow diagram of the logic of the processes by which information pertaining to a given host program is computed and stored prior the infection of the host program. For each host program to be protected, the program data 30 is input for computation 31 of a checksum of the data, the length of the data, and information pertaining to the beginning and end of the data. The information is then added 32 to a database 33 that contains the information for the given host program, and possibly contains similar information for other host programs that have previously been submitted to the same procedures. FIG. 2b shows a flow diagram of the logic of the processes by which the stored information is used to recover the original host program subsequent to its infection. If a modified host program 41 is suspected of having been modified by a virus, the database 33 is searched 42 to determine whether it contains previously stored information on the original version of the host. If it does not, generic disinfection cannot be performed, and an appropriate failure message 43 is delivered in a suitable form to another software process or displayed to the user. If the database 33 does contain previously stored information, this information 44 is extracted from the database, and a search 45 is conducted for byte sequences that produce the same BeginInfo and EndInfo as was recorded in the database. If the condition 46 that at least one instance of BeginInfo and at least one instance of EndInfo be found in the modified host program 41 is not satisfied, the original host cannot be recovered, and a failure message 47 of the same type as the failure message 43 is delivered. Otherwise, a trial reconstruction 48 of the original host is generated under the constraints that its length be equal to that of the original host, its beginning occurs at the offset implied by BeginOffset, and its end occurs at the offset implied by EndOffset. A checksum 49 of the trial reconstruction is then computed (possibly with the aid of the checksum computed for the previous trial reconstruction), and compared 50 with the checksum of the original host as taken from the database. If the checksums are not equal, the condition 51 that there are other legal reconstructions that remain to be tried is checked; if so, a subsequent trial reconstruction 48 is generated, its checksum is compared with the original checksum, etc. If the condition 51 is not satisfied, a failure message 52 of the same type as the failure message 43 is delivered. If the comparison 50 finds the checksum of the trial reconstruction 48 and the original host checksum to be equal, the trial reconstruction 48 is output 53 as the original data 54.

A fuller description is now provided of a preferred implementation that is particularly suited to DOS environments, but is sufficiently general to work in many other environments as well, perhaps with some minimal and apparent modifications.

First, some background on the cyclical redundancy check (CRC) that is used as the checksum is provided. Next, the contents of the database are discussed; this is followed by a detailed treatment of how the information in the database is used to disinfect an infected program, or to determine whether it can be disinfected.

A. Background on Cyclical Redundancy Checks

Cyclical redundancy checks are well-known in the field of communications, particularly in the realm of error detection and correction. A sequence of K bits $B=\{b_{K-1}b_{K-2} \ldots b_1b_0\}$ can be interpreted as the coefficients of an information polynomial in a "dummy" variable $\chi$:

$$b(\chi) = \sum_{i=0}^{i=K-1} b_i\chi^i. \tag{1}$$

A second bit sequence $\{g_Lg_{L-1} \ldots g_1g_0\}$, where $g_L$ and $g_0$ are both 1 and the other coefficients are either 0 or 1, can be interpreted as the generator polynomial $g(\chi)$:

$$g(\chi) = \sum_{i=0}^{i=L} g_i\chi^i. \tag{2}$$

Then the CRC polynomial is given by:

$$c(\chi) = \sum_{i=0}^{i=L-1} c_i\chi^i = Rem_{g(\chi)}[b(\chi)\chi^L], \tag{3}$$

where $Rem_{g(\chi)}$ denotes the remainder upon division by $g(\chi)$, the arithmetic on the coefficients being performed modulo 2. The bit sequence $C=\{c_{L-1} c_{L-2} \ldots c_1c_0\}$ is referred to as the CRC of the bit sequence B: $C=CRC_g[B]$. Note that the value of the CRC depends on the generator polynomial, which can be chosen at random or selected to satisfy certain criteria. For notational simplicity, all further explicit reference to the generator polynomial will be suppressed; it will be assumed that a chosen fixed generator will be used for all computations.

A variety of efficient methods for computing CRC's exist. One such method computes the CRC in chunks of bytes (blocks of 8 bits); this requires the generator polynomial L to be a multiple of 8. First, a table of CRC's for each of the 256 possible byte values is computed. Suppose the CRC of a sequence of n bytes $\beta=\{\beta_0\beta_1 \ldots \beta_{n-2}\beta_{n-1}\}$ is known. Then, from equations 1, 2, and 3, it can be shown that, if an additional byte $\alpha$ is appended to the byte string $\beta$, the CRC of the resultant string $B\alpha$ is easily computed from that of $\beta$:

$$CRC[\beta\alpha]=Rem[Shift[CRC[\beta]]]\oplus CRC[\alpha] \tag{4}$$

In Eq. 4, "Shift" denotes a one-byte left shift, in which a zero is brought in from the right and the left-most byte is retained. (In terms of the associated polynomials, the left shift is represented as multiplication by $\chi^8$. Furthermore, "Rem" is to be re-interpreted as a bytewise rather than a bit-wise operation in the following way. Suppose that the order of the generator polynomial is L. The remainder with respect to this generator can be represented as an (L÷8)-byte quantity. In all of the cases of relevance to this invention (such as the left shift of a previous CRC value in Eq. 4), the argument of the Rem function will be just one byte longer than the CRC, and the result will be:

$$Rem[\beta_0\beta_1 \ldots \beta_{L/8}]=\beta_1\beta_2 \ldots \beta_{L/8}\oplus CRC[\beta_o] \tag{5}$$

Equations 4 and 5 demonstrate that the CRC of any given byte sequence may be computed efficiently. The easy computability of CRC's is well known; this is one reason for their wide usage. It is also well known that CRC's are at least moderately secure, and that for certain "irreducible" generator polynomials they are perfect hash functions (among a random set of files, all possible values of the CRC are equi-probable). However, the last requirement cited in the invention summary, re-usability, is peculiar to this invention, and will now be examined further.

Equation 4 is one example of re-usability: the use of the checksum of one byte string to compute that of the same byte string with an additional byte appended to it in constant time, rather than time proportional to the length of the string. However, this invention makes use of two additional re-usability properties. The first is useful in scanning through a file in search of BeginTag and EndTag, and can lead to speedups in this phase of the reconstruction by an order of magnitude (roughly a factor of 10); the second converts an operation that would be quadratic in the length of the original host to one that is linear (resulting in many orders of magnitude speed-up in the typical case).

1. Suppose that BeginTag and EndTag are CRC's based on contiguous blocks of TagLength bytes. Then, for scanning purposes, it would be useful to express the CRC of a byte sequence Bβ in terms of the CRC of the sequence αB, where α and β are single bytes, and B represents a sequence of TagLength−1 bytes. Combining several of the above equations, it can be shown that $$CRC(B\beta) = Rem[Shift[CRC[\alpha B]]] \oplus CRC[\beta] \oplus CRC[\alpha 0^{TagLength}] \quad (6)$$

where $0^{TagLength}$ represents a sequence of TagLength zeroes. Just as a table of CRC[β] for all 256 possible values of β can be precomputed, so can a corresponding table of CRC $[\alpha 0^{TagLength}]$ for all 256 possible values of α.

Figure 4:
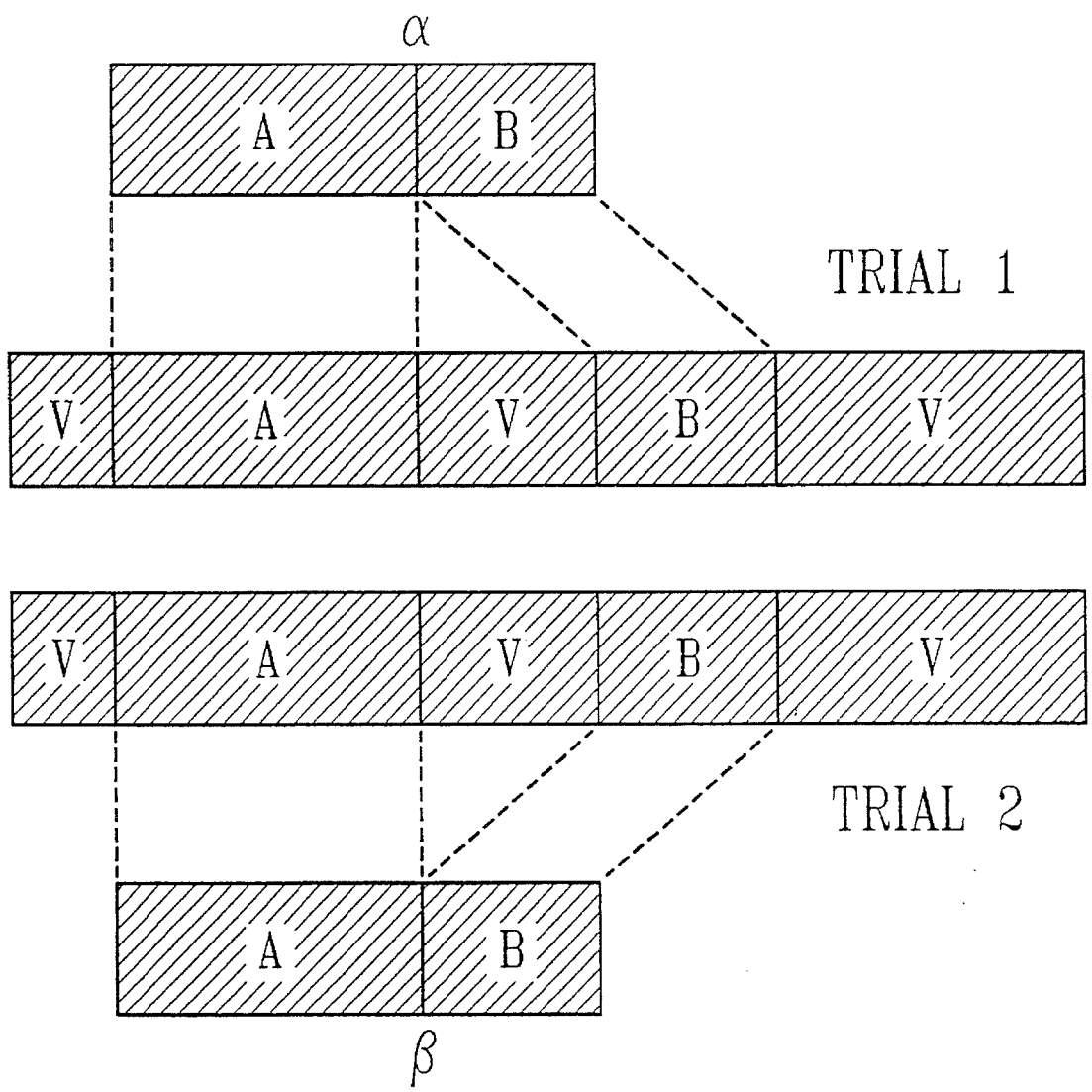
FIG. 4 shows successive trial reconstructions for non-overwriting viruses.

2. During trial-and-error reconstruction of the host, the CRC's of a succession of candidate reconstructions, each of length equal to that of the original host, are computed. The first candidate will be the one in which BeginSection is as long as possible (and hence EndSection is shortest). Then, in successive trials, EndSection is extended backwards one byte at a time (with a corresponding shrinkage from the end of BeginSection). Thus, as illustrated in FIG. 4, two successive candidates (trial 1 and trial 2) will have the form AαB and AβB, where α and β are single bytes. In other words, a candidate with BeginSection=Aα and EndSection=B will be succeeded by a candidate with BeginSection=A and EndSection=βB. The contributions of A and B to the overall CRC are equivalent in the two cases. It follows from several preceding equations that $$CRC[A\beta B] = CRC[A\alpha B] \oplus Rem[Mult[\omega(n), (\alpha \oplus \beta)]] \quad (7)$$

where n is the number of bytes in the sequence B, and $$\omega(n) = CRC[10^n] \quad (8)$$

where the argument of the CRC function is a byte string consisting of a "1" followed by n zeroes. Mult represents the polynomial multiplication function, which is performed by converting the arguments into bit-wise polynomials, multiplying the polynomials (with coefficient arithmetic performed modulo 2), and then converting the resultant product polynomial to a byte-wise representation. Note that, since the second argument of Mult in Eq. 7 is a single byte, the result of the multiplication exceeds the length of the CRC by just one byte. Thus the byte-wise Rem function defined in Eq. 5 is applicable. ω(n) can be computed from its predecessor via:

$$\omega(n) = Rem[Shift[\omega(n-1)]] \quad (9)$$

(Note that Eq. 9 is simply a special case of Eq. 4.)

B. Contents of the Database

A preferred implementation of the database described here is somewhat more elaborate than what was described in the invention summary. A brief motivation for the extensions and for the type of checksum that has been chosen will be followed by a detailed description of the database entry for each host program.

The first several bytes (the "header") of certain types of DOS programs (particularly those of the "EXE" format) contain information about the program that is used by the operating system, such as the offset of the instruction at which execution should begin. To ensure that control is passed to itself rather than the host, a computer virus modifies this header. Although the modified data may be saved by (and within) the virus, it may be encrypted and placed in an unknown location. Without specific knowledge of the virus, it is usually impossible to locate and decrypt the original host header. For this reason, the header of each program will be stored in the database. In the DOS operating environment, storing the first 24 bytes of the file is almost always adequate. The situation is similar in operating systems other than DOS, and can be handled similarly.

Note that, since the program header cannot be expected to be found intact in an infected program, BeginTag must be based upon bytes that occur as soon as possible after the end of the header.

An important practical issue arises: Programs often contain large regions of repeated bytes, sometimes near the beginning or end of the program. In such cases, the BeginTag and/or EndTag can occur a multitude of times within the file, potentially resulting in a large number of pairs of (BeginTag, EndTag) that have to be considered during the trial-and-error host reconstruction phase of the disinfection procedure. This can cause the procedure to take an inordinate amount of time, and produce a risky number of possible reconstructions. Experience with DOS programs has revealed that this harmful multiplicity can be vastly reduced by basing the tags on regions that are as close as possible to the beginning (or end) of the file, but do not contain repeated bytes.

FIG. 5 illustrates the selection of the bytes upon which BeginTag and EndTag are based for a case in which the header is 24 bytes long, and BeginTag and EndTag are based on 8-byte sequences. Note that the BeginTag sequence is chosen to begin with the last byte in a sequence of repeated "00" bytes following the header, and the EndTag sequence is chosen to end with the first byte of a sequence of repeated "1A" bytes at the end of the host.

The type of checksum chosen for this implementation is a 32-bit (4-byte) cyclical redundancy check (CRC). While not an absolute requirement, it is most convenient if the generator polynomial used for the CRC is the same for BeginTag, EndTag, and the full-file checksum, as this leads to some savings in memory and to somewhat faster computation. With use of a 4-byte CRC based on an irreducible generator polynomial, the probability for two inequivalent random files to have the same checksum is $2^{-32}$, or less than 1 in 4 billion.

Furthermore, CRC's of at least 4 bytes are difficult for viruses to forge, are easily computable, and are easily re-usable, as has been established in Eqs. 6 and 7. Any other checksum satisfying the criteria outlined in the invention summary would be suitable as well.

TABLE 1

| | Database entry for a file protected by the invention. | |
|---|---|---|
| Item | Size (bytes) | Description |
| FileName | Several | name of the file or a pointer to file name |
| FileLength | 4 | length of file, in bytes |
| Header | HeaderLength (24) | first HeaderLength bytes of file |
| BeginTag | 4 | checksum of the BeginTagLength |

TABLE 1-continued

Database entry for a file protected by the invention.

| Item | Size (bytes) | Description |
| --- | --- | --- |
| | | (typically 16) bytes at "beginning" of file |
| BeginOffset | 4 | offset of "beginning" from first byte beyond Header |
| BeginRepeated Byte | 1 | value of byte at "beginning" of file |
| EndTag | 4 | checksum of the EndTagLength (typically 16) bytes at "end" of file |
| EndOffset | 4 | offset of "end" from actual end of file |
| EndRepeatedByte | 1 | value of byte at "end" of file |
| FullChecksum | 4 | checksum of entire file |

For this particular implementation, the database consists of a list of database records, one for each host program. A database record for a given file contains the information given in Table 1. Aside from the file name (or a pointer to the file name), the amount of storage required per file is 50 bytes, assuming that HeaderLength is 24 bytes.

In Table 1, the "beginning" and "end" of the file are defined in such a way as to avoid the above-mentioned problem with repeated bytes near the beginning and end of files:

Beginning: Starting at the byte just after the file Header, keep scanning bytes until at offset i one is found that differs from its predecessor at offset i−1. Then BeginOffset=i−HeaderLength−1, and the "beginning" of the file is at offset HeaderLength+BeginOffset.

End: Starting at the end of the file, keep scanning backwards until at offset i a byte is found that differs from its predecessor at offset i+1. Then EndOffset=(FileLength−1)−(i+1), and the "end" of the file is at offset (FileLength−1)−EndOffset=i+1.

C. Host Disinfection

If the original host appears contiguously anywhere in the infected file, or even if it has been chopped into two contiguous regions, the algorithm described here is very likely to restore it. (The only conceivable problem that could occur is if one of the contiguous regions were smaller than TagLength, in which BeginTag or EndTag would not be located.) The algorithm can also deal with certain overwriting viruses that write themselves into data regions in the original host. If the data regions consists entirely of a single repeated byte (which is what such viruses tend to look for), the algorithm can almost certainly restore the file.

There are two phases to the disinfection procedure:
1. Location of all instances of BeginTag and EndTag
2. Trial-and-error reconstruction of host

C.1. Location of Tags

In the particular implementation described here, BeginTag and EndTag are 4-byte CRC's of TagLength-byte sequences near the beginning and end of the original host. Thus the 4-byte CRC must be computed for each TagLength-byte sequence of the modified host, and compared with BeginTag and EndTag. A naive approach would be to compute the CRC of each such TagLength byte-sequence from scratch. A more efficient method is to compute the CRC of the first TagLength bytes by any means, such as Eq. 4, and then to use Eq. 6 to compute the CRC of successive TagLength-byte sequences in turn. The CRC of each TagLength-byte sequence is compared with BeginTag and EndTag. If a match to BeginTag occurs at a particular offset from the beginning of the modified host (measured in bytes), that BeginOffset is added to a list BeginOffsetList of possible "begin" offsets; if a match to EndTag occurs at a particular offset from the beginning of the modified host, the offset EndOffset of the last byte in the matching TagLength byte-sequence is added to a list EndOffsetList of possible "end" offsets.

A very small minority of viruses move just slightly more than the first HeaderLength bytes to another location within an infected file. If the number of such bytes is less than HeaderLength+TagLength, the byte region from which BeginTag is computed will be split, and BeginTag will not be found in the infected file. To handle this case, the header bytes themselves are used as a surrogate BeginTag: the modified file is scanned for an exact or (perhaps) inexact match to the bytes that constitute the Header, and an effective BeginOffset is derived from any such match and added to BeginOffsetList.

C.2. Trial-and-Error Reconstruction

If at least one possible BeginOffset and EndOffset is found, the method attempts to obtain the old full-file CRC via trial and error. Otherwise, it is concluded that the program cannot be reconstructed, perhaps due to irreparable damage by an overwriting virus. The trial and error method is carried out over all possible pairs of "begin" and "end" offsets until the old fullfile CRC is reproduced or all pairs have been tried. For the sake of efficiency, the ordering of the pairs can be biased so as to try the most likely pair first; in one implementation this is achieved by ordering the "begin" offsets in ascending order and the "end" offsets in descending order.

For each pair of possible "begin" and "end" offsets, the trial and error reconstruction proceeds as follows. Candidate reconstructions TrialReconstruction, of length equal to that of the original host, FileLength, are formed by appending to the saved header the byte sequence BeginSection (a section of contiguous bytes beginning at the "begin" offset, and of length BeginSectionLength), followed by the byte sequence EndSection (a section of contiguous bytes ending at the "end" offset, and of length EndSectionLength). TrialReconstruction is accepted as the original host if its CRC matches that of the original host.

The first candidate reconstruction is the one in which BeginSectionLength is as large as possible, given the constraint that EndSectionLength must be at least TagLength bytes, and that BeginSection cannot extend beyond the end of the modified file. The CRC of TrialReconstruction is computed by ordinary means, such as the use of Eq. 4. If it reproduces the CRC of the original host, TrialReconstruction is taken to be the original host, and no further computation is required. If the CRC of the original host is not reproduced, but the "end" offset is located at the same distance from the "begin" offset as it was in the original file (i.e., FileLength−HeaderLength), it is assumed that some overwriting may have taken place, and another reconstruction algorithm (to be described later) is brought into play.

Otherwise, if the distance between the "begin" and "end" offsets is different from what it was in the original host, the quantity $\omega(\text{EndSectionLength})=\text{CRC }[10^{EndSectionLength}]$ is computed by any means, such as that of Eq. 9. Then, the CRC of the next candidate reconstruction, formed by extending EndSection backwards by one byte (hence increasing EndSectionLength by 1) and shrinking BeginSection by one byte (see FIG. 4), must be computed. Recomputation of the CRC from scratch is unnecessary. Instead, Eq. 7 can be used to compute the CRC of the current TrialReconstruction from the CRC of the previous TrialReconstruction, with $\alpha$ interpreted as the former last byte of BeginSection, $\beta$ as the current first byte of EndSection, and $\omega$ as above. If the candidate reconstruction fails, $\omega$ is recomputed via Eq. 9, the CRC of the next candidate is computed, etc. The procedure continues until reconstruction succeeds (i.e., TrialReconstruction's CRC matches FullChecksum), or until a boundary is hit: the beginning of EndSection reaches the beginning of the modified host file, or BeginSectionLength diminishes to TagLength bytes.

The only case that remains to be considered is that in which the previous series of trial reconstructions has failed, but the relative positions of the "begin" and "end" offsets are the same as in the original host. Such a case could arise from an overwriting virus. Often, overwriting viruses show little consideration for their host, and blithely write themselves over an arbitrary portion of it; hosts that have been thus victimized are virtually impossible to disinfect. However, some overwriting viruses are somewhat more selective, and only overwrite sections of the host that appear to consist of useless data. This is typical of more prevalent viruses, since the host's function is less likely to be obviously disrupted, and the virus is less likely to be detected. A quite reasonable criterion that is often employed by viruses for the purpose of identifying "useless" data is that it consist of a long block of repeated bytes or repeated groups of bytes.

If the virus is longer than the region of repeated bytes, data lying beyond the region is overwritten, and reconstruction will fail. However, if the virus is shorter than the region of repeated bytes, it may place itself entirely within the boundaries of that region. If the virus is several bytes shorter than the region, some repeated bytes will remain before and/or after the virus. In this case, the method uses a trial-and-error method to reconstruct the original host.

Figure 6:
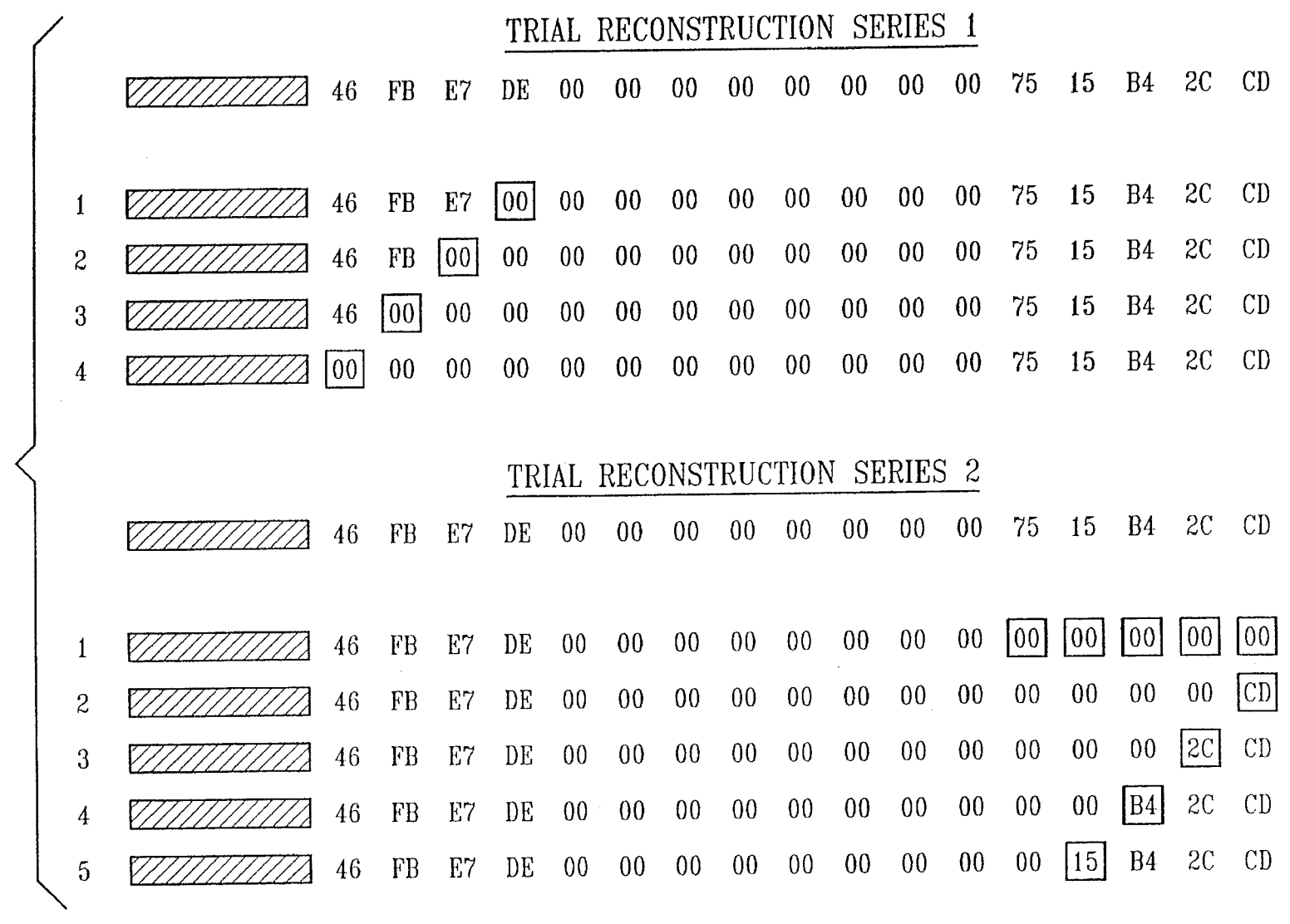

The basic idea behind the trial-and-error method for removing an overwriting virus is to scan through the modified host in search of regions of repeated bytes that are longer than some chosen threshold. For any such region, two series of trial reconstructions are made, as illustrated in FIG. 6. The first assumes that the virus has inserted itself just in front of the region. The region of repeated bytes is extended backwards one byte at a time, in search of a TrialReconstruction whose CRC matches FullChecksum until the beginning of the file is encountered. The second series explores the possibility that the virus has inserted itself just after the region of repeated bytes. The region of repeated bytes is first extended forward to the end of the file, and successive TrialReconstructions are formed by repealing the extension backward one byte at a time, i.e., replacing the repeated byte by the original value of the byte that was present in the modified host.

More explicitly, suppose that the scan discovers a region of repeated bytes extending from offset BeginRepRegion to offset EndRepRegion (where offsets are measured in bytes from the beginning of the file). Then the first series of trial reconstructions would start by computing the CRC of the entire modified file, which is taken as the first TrialReconstruction. (It has already been established that the CRC of this TrialReconstruction does not match FullChecksum.) Also computed at this time is $\omega(\text{NewFileLength}-\text{BeginRepRegion})$. Then, Eq. 7 is used to compute the CRC of each TrialReconstruction in terms of that of its predecessor and $\omega$, with $\alpha$ interpreted as the byte of the modified file that is replaced, and $\beta$ as the value of the repeated byte. If the CRC of a TrialReconstruction matches that of the original host, it is taken to be equivalent to the original host, and the algorithm terminates successfully. Otherwise, $\omega$ is updated as per Eq. 9, and a new TrialReconstruction is evaluated unless the beginning of the file or some other limit (such as some upper limit on the presumed size of the virus) has been encountered.

If the first series of trial reconstructions fails to produce a TrialReconstruction whose CRC matches that of the original host, a second series is made, in which the region of repeated bytes is first extended from EndRepRegion to the end of the file (or perhaps some other reasonable stopping point). The CRC of this first TrialReconstruction is computed. If it fails to match FullChecksum, $\omega(0)=\text{CRC}$ is computed. (This assumes that the repeated-byte region has been extended to the end of the file; otherwise, the argument of the $\omega$ function is simply the offset of the end of the extended region from the end of the file.) Then, Eq. 7 is used to compute the CRC of each TrialReconstruction in terms of that of its predecessor and $\omega$, with $\alpha$ interpreted as the value of the repeated byte and $\beta$ as the value of the byte at that position in the modified host file. If the CRC of a TrialReconstruction matches that of the original host, it is taken to be equivalent to the original host, and the algorithm terminates successfully. Otherwise, $\omega$ is updated as per Eq. 9, and a new TrialReconstruction is evaluated. If the offset EndRepRegion is reached without having found a match to the original CRC, the disinfection algorithm terminates with an appropriate failure message. In both phases of the attempt to reconstruct an overwritten host, the trial reconstructions proceed by moving the trial boundary (the beginning or end of the repeated-byte region) backwards through the modified host. The backwards direction is taken because of the irreversibility of Eq. 9: $\omega(n)$ can be computed easily from $\omega(n-1)$, but it is difficult to obtain $\omega(n-1)$ from $\omega(n)$.

In addition to its use in restoring infected host programs to their original uninfected state, the generic disinfection method has at least three further uses:

1. as a valuable heuristic for determining whether a host program is infected with a previously unknown virus: if a host program can be disinfected by this procedure (which is after all tailored to the way that viruses infect programs), it is extremely likely that the modification is due to a virus;

2. as a method for providing information about the attachment pattern of a previously unknown virus to humans or as input to other anti-virus software programs: the attachment pattern is inferred trivially from the location of BegiOffset and EndOffset of the successful trial reconstruction, or the location of the overwritten section in the case of overwriting viruses; and 3. as a method for constructing an uninfected version of an infected data sample, for use in the automatic analysis of a computer virus' structure and means of attachment to its host (see related patent application Ser. No. 08/342,949, now U.S. Pat. No. 5,485,575).

Also included within the scope of the invention are further extensions of the method, in which information taken from other significant locations in the original host could be computed and stored in the database, and then searched for if the host subsequently becomes modified. An important class of "significant locations" includes regions of the original host that are vulnerable to attack by a virus, such as the entry point or the target of a branch instruction. The generated trial reconstructions would contain portions of the modified host in the vicinity of located "significant locations".

Further included within the scope of the invention are extensions of the method designed to handle viruses that encrypt some or all of the original host. Suppose it is thought that a particular form of encryption has been applied to the host. Then the method as described above can be augmented by an additional step prior to the search for BeginTag and EndTag, in which an invariant transformation appropriate to the supposed encryption method is applied to the modified file. (Refer to U.S. Pat. No. 5,442,699 for further explanation of invariant transformations.) For example, if the host is thought to have been subjected to 1-byte exclusive-OR encryption, each byte of the modified host can be exclusive-OR'ed with the byte following it to produce a transformed modified host that is independent of the encryption key. The transformed modified host can then be searched for a BeginTag and EndTag that were computed for a similar invariant form of the original host, and stored in the database. This permits the beginning and end of the original host within the modified host to be located; the encryption key can be determined easily by a variety of means. One such method is to store in the database the first byte from which BeginTag was computed and the last byte from which EndTag was computed in the original host. These bytes can be compared with the analogous bytes in the modified host, an exclusive-OR of the original byte with its value in the modified host yields the encryption key for BeginTag and EndTag. Trial reconstructions are generated in the manner previously described, except that they are based on a decrypted version of the modified host rather than the modified host itself.

Figure 3:
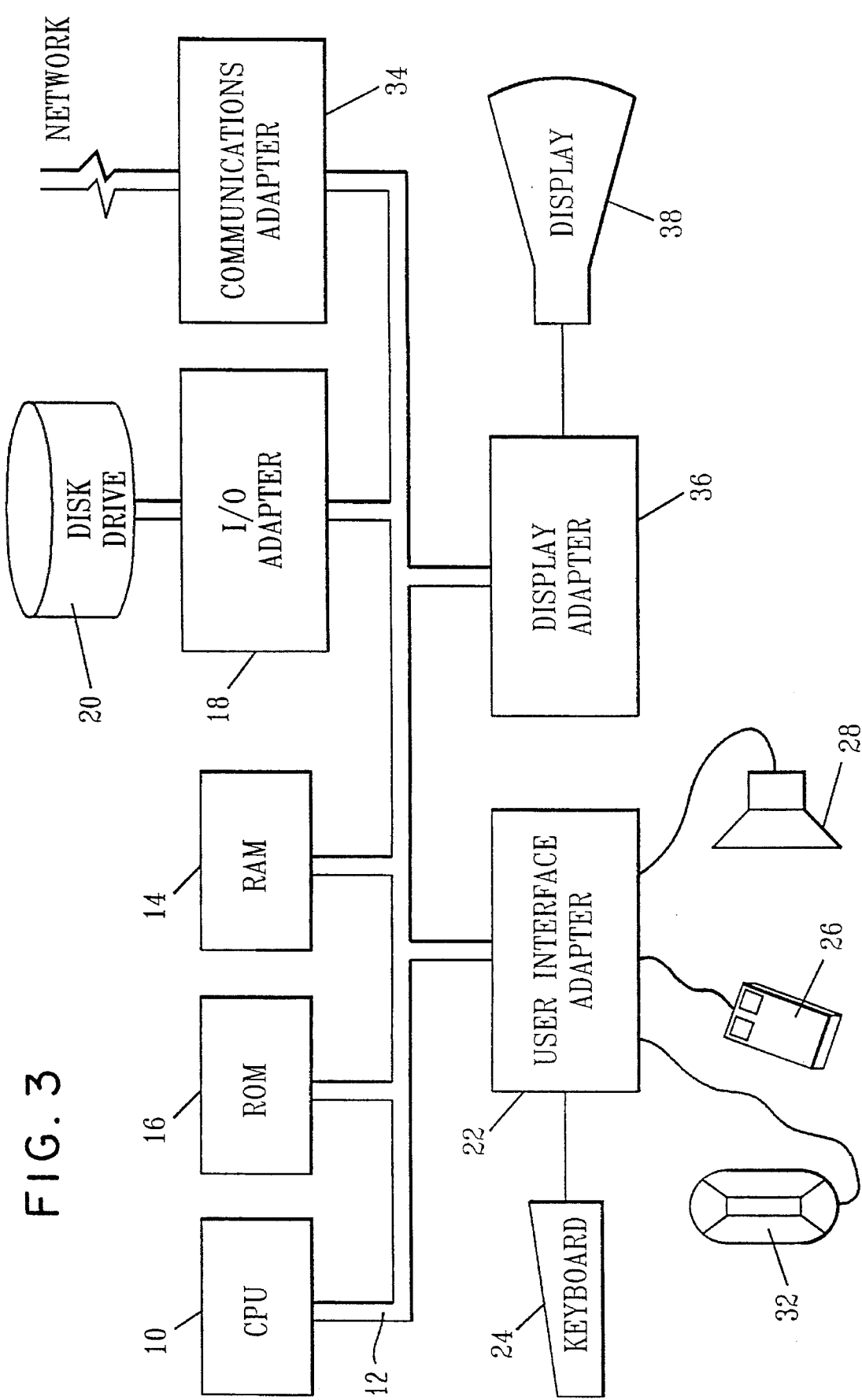
FIG. 3 is a block diagram showing a hardware configuration on which the subject invention may be implemented.

Referring now to FIG. 3, there is shown a representative hardware environment on which the subject invention may be implemented. This hardware environment may be a personal computer, such as the International Business Machines (IBM) Corporation's PS/2 series of personal computers, or a work station, such as IBM's RS/6000 Workstations. These are but representative examples, and it will be understood by those skilled in the data processing arts that the invention is not limited to these computers and may be advantageously practiced on other and different computers including mini and mainframe computers.

For the specific example of a personal computer, the hardware includes a central processing unit (CPU) 10, which may be, for example, a microprocessor supporting the X86 architecture of Intel Corporation, or a reduced instruction set computer (RISC) microprocessor such as IBM's PowerPC microprocessor. The CPU 10 is attached to a system bus 12 to which are attached a read/write or random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The user interface adapter 22 has attached to it a keyboard 24, a mouse 26, a speaker 28, a microphone 32, and/or other user interface devices (not shown). The personal computer also includes a display 38, here represented as a cathode ray tube (CRT) display but which may be a liquid crystal display (LCD) or other equivalent display. The display 38 is connected to the system bus 12 via a display adapter 34. Optionally, a communications adapter 34 is connected to the bus 12 and to a network, for example, a local area network (LAN), such as IBM's Token Ring LAN. Alternatively, the communications adapter may be a modem connecting the personal computer to a telephone line as part of a wide area network (WAN).

While the invention has been described in particular with respect to preferred embodiments thereof, it will be understood by those skilled in the art that modifications to the preferred embodiments can be effected without departing from the spirit and scope of the invention.

We claim:

1. For a program initially having a non-infected state that subsequently attains an infected state as a result of infection with a computer virus, a method for restoring the computer program from the infected state to the non-infected state, comprising:

(a) storing, in a computer memory, electrical signals representing a plurality of parameters of the program in the non-infected state, the parameters comprising:

i. the length, in bytes, of the program in the non-infected state;

ii. a checksum of the program in the non-infected state;

iii. information pertaining to bytes in the program in the non-infected state, near the beginning of the program in the non-infected state, designated BeginInfo;

iv. information pertaining to bytes in the program in the non-infected state near the end of the program, designated EndInfo;

(b) scanning the program in the infected state for a first sequence of bytes characterized by BeginInfo, and for a second sequence of bytes characterized by EndInfo;

(c) generating one or more trial program reconstructions, based upon byte sequences found in the program in the infected state;

(d) computing a checksum of each trial program reconstruction;

(e) comparing the checksum of the each trial program reconstruction with the checksum of the program in the non-infected state;

(f) using the trial program reconstruction possessing a checksum equal to the checksum of the program in the non-infected state, if it exists, restoring the program from the infected state to the non-infected state.

2. The method of claim 1, wherein the checksum of the program in the non-infected state is a cyclical redundancy check.

3. The method of claim 1, wherein BeginInfo includes an initial number HeaderLength of bytes of the program in the non-infected state, where HeaderLength is a chosen non-negative constant.

4. The method of claim 3, wherein BeginInfo further includes:

(a) BeginTag, wherein BeginTag represents the result of applying a function BeginTagFunction to a contiguous region comprising a number BeginTagLength bytes following the initial number HeaderLength of bytes of the program in the non-infected state, where BeginTagLength is a chosen constant;

(b) an offset of BeginTag from the beginning of the program in the non-infected state.

5. The method of claim 4, wherein the contiguous region of bytes is the first contiguous region of BeginTagLength bytes that follows the initial number HeaderLength of bytes of the program in the non-infected state in which not all of the bytes have the same value.

6. The method of claim 5, wherein the information BeginInfo includes BeginRepeated-Byte, the value of the first byte within the first contiguous region of BeginTagLength bytes in which not all of the bytes have the same value.

7. The method of claim 4, wherein the function BeginTagFunction of the contiguous region of bytes is the identity.

8. The method of claim 4, wherein the function BeginTagFunction of the contiguous region of bytes consists of a checksum of the contiguous region of bytes.

9. The method of claim 8, wherein the checksum is a cyclical redundancy check.

10. The method of claim 3, wherein:

(a) BeginInfo further includes:
  (i) BeginTag, wherein BeginTag represents the result of applying a function BeginTagFunction to a contiguous region comprising a number BeginTagLength bytes following the initial number HeaderLength of bytes of the program in the non-infected state, where BeginTagLength is a chosen constant;
  (ii) an offset of BeginTag from the beginning of the program in the non-infected state;

(b) EndInfo includes:
  (i) EndTag, where EndTag represents the result of applying a function EndTagFunction to a contiguous region comprising a number EndTagLength of bytes near the end of the program, wherein EndTagLength is a chosen constant;
  (ii) an offset of EndTag from the end of the program in the non-infected state.

11. The method of claim 10, further comprising:

(a) computing an offset of BeginTag from the program in the infected state, comprising the steps of:
  (i) computing a function BeginTagFunction of each contiguous region comprising a number BeginTagLength of bytes in the program in the infected state;
  (ii) comparing the function BeginTagFunction with BeginTag;
  (iii) recording in a list BeginOffList an offset of any contiguous region from the beginning of the program in the infected state for which the function BeginTagFunction equals BeginTag;

(b) Computing an offset of EndTag from the end of the program in the infected state, comprising the steps of:
  (i) computing a function EndTagFunction of each contiguous region of EndTagLength bytes in the program in the infected state;
  (ii) comparing the function EndTagFunction with EndTag;
  (iii) recording in a list EndOffList an offset EndOffset of any contiguous region from the end of the program in the infected state for which the function EndTagFunction equals EndTag.

12. The method of claim 11, in which BeginTagFunction is a checksum computed via linear modular-arithmetic, in which the checksums of successive byte sequences in the program in the infected state are computed from previous checksums.

13. The method of claim 12, in which the checksum is a cyclical redundancy check, and the checksums of successive byte sequences in the program in the infected state are computed from previous checksums as follows:

$$CRC(B\beta) = Rem[Shift[CRC[\alpha B]]] \oplus CRC[\beta] \oplus CRC[\alpha 0^{TagLength}]$$

where B represents a sequence of bytes, $\alpha$ and $\beta$ are single bytes, and $0^{TagLength}$ represents a sequence of zeros.

14. The method of claim 11, in which EndTagFunctionB is a checksum computed via linear modular-arithmetic, in which the checksums of successive byte sequences in the program in the infected state are computed from checksums computed for preceding byte sequences, i.e., from previous checksums.

15. The method of claim 14, in which the checksum is a cyclical redundancy check, and the checksums of successive byte sequences in the program in the infected state are computed from previous checksums as follows:

$$CRC(B\beta) = Rem[Shift[CRC[\alpha B]]] \oplus CRC[\beta] \oplus CRC[\alpha 0^{TagLength}]$$

where B represents a sequence of bytes, $\alpha$ and $\beta$ are single bytes, and $0^{TagLength}$ represents a sequence of zeros.

16. The method of claim 11, in which the step of generating one or more trial reconstructions comprises, for each possible pair of BeginOffset (from BeginOffList) and EndOffset (taken from EndOffList)

(a) appending to the bytes of a header contained in a portion of BeginInfo designating a header for the program in the non-infected state a byte sequence BeginSection of length BeginSectionLength starting at offset BeginOffset in the program in the infected state, followed by a byte sequence EndSection of length EndSectionLength ending at offset EndOffset in the program in the infected state;

(b) generating a first trial reconstruction with BeginSectionLength of maximal length, and EndSectionLength being of such length that the total length of the trial reconstruction equals the difference in length between the program in the infected and non-infected states;

(c) generating successive trial reconstructions such that the last byte of the previous trial reconstructions' BeginSection is removed, and the previous trial reconstruction EndSection is extended backwards to pick up another byte in the program in the infected state.

17. The method as recited in claim 11, wherein the step of generating one or more trial reconstructions comprises, for each possible pair of BeginOffset (from BeginOffList) and EndOffset (from EndOffList) satisfying the condition that they are separated by the same distance as in the program in the non-infected state:

(a) generating a first trial reconstruction comprising all of the bytes of the program in the infected state from BeginOffset to EndOffset, inclusive, except that the first portion is overwritten by a header contained in a portion of BeginInfo designating a header for the program in the non-infected state;

(b) generating a series of trial reconstructions, each of which replaces the value of particular bytes in the first trial reconstruction with an estimate of the value of the particular bytes in the program in the non-infected state.

18. The method as recited in claim 17, wherein the location of bytes to be replaced in the trial reconstruction is determined in part by searching for regions of repeated bytes, and the estimate of the value of the bytes or groups of bytes in the program in the non-infected state is made by extending a pattern representing the regions of repeated bytes or groups of bytes.

19. The method as recited in claim 18, wherein an end of a region of bytes to be replaced is a byte immediately preceding a region of repeated bytes.

20. The method as recited in claim 19, wherein, for each successive trial reconstruction, a beginning of the region of bytes to be replaced is extended towards the beginning of the program in the infected state.

21. The method as recited in claim 18, wherein a beginning of the region of bytes to be replaced is a byte immediately following a region of repeated bytes.

22. The method as recited in claim 21, wherein, for each successive trial reconstruction, the end of the region of replaced bytes is shifted towards the beginning of the program in the infected state.

23. The method of claim 1, wherein EndInfo includes:
(a) EndTag, where EndTag is the result of applying a function EndTagFunction to a contiguous region comprising a number EndTagLength of bytes near the end of the program, and where EndTagLength is a chosen constant;
(b) an offset of EndTag from the end of the program in the non-infected state.

24. The method of claim 23, wherein the contiguous region of bytes near the end of the program in the non-infected state is the last EndTagLength bytes of the program in the non-infected state.

25. The method of claim 23, wherein the contiguous region of bytes near the end of the program in the non-infected state is that which is closest first contiguous region comprising a number BeginTagLength of bytes in which all of the bytes have the same value.

26. The method of claim 25, wherein the information EndInfo includes EndRepeatedByte, the value of the last byte in the contiguous region of EndTagLength bytes closest to the end of the program in which not all of the bytes have the same value.

27. The method of claim 23, wherein the function EndTagFunction of the contiguous region of bytes is the identity.

28. The method of claim 23, wherein the function EndTagFunction of the contiguous region of bytes consists of a checksum of the contiguous region of bytes.

29. The method of claim 28, wherein the checksum is a cyclical redundancy check.

30. The method of claim 1, in which the checksum of each successive trial reconstruction is computed from that of a preceding reconstruction.

31. The method of claim 30, in which the checksum is a cyclical redundancy check, and the checksum of each successive trial reconstruction is computed from that of the preceding reconstruction as follows:

$$CRC[A\beta B]=CRC[A\alpha B]\oplus Rem[Mult[\omega(n), (\alpha\oplus\beta)]]$$

where $A\alpha$ is a beginning section of a first trial reconstruction, B is an end section of the first trial reconstruction, A is a beginning section of a second trial reconstruction, $\beta B$ is an end section of the second trial reconstruction, n is the number of bytes in B, $\omega(n)=CRC[10^n]$, and $\alpha$ and $\beta$ are single bytes.

32. For a program capable of having a non-infected state, and an infected state in which the program is infected with a computer virus, a method, when the program is suspected of being in the infected state, for determining when the program has attained the infected state, comprising:
(a) storing, in a memory, electrical signals representing a plurality of parameters of the program in the non-infected state, the parameters comprising:
  i. the length of the program in bytes;
  ii. a checksum of the program;
  iii. information pertaining to bytes in the program near the beginning of the program, designated BeginInfo;
  iv. information pertaining to bytes in the program near the end of the program, designated EndInfo;
(b) scanning the program suspected of being in the infected state for a first sequence of bytes characterized by BeginInfo and EndInfo;
(c) generating one or more trial program reconstructions of the program in the non-infected state, based upon byte sequences found in the program in the infected state;
(d) computing a checksum of each trial program reconstruction;
(e) comparing the checksum of the each trial program reconstruction with the checksum of the program in the non-infected state;
(f) if any trial program reconstruction possessing a checksum equal to the checksum of the program in the non-infected state can be found, outputting an indication that the computer program is in the infected state.

33. The method as recited in claim 32, wherein the output indication is provided in a form suitable for alerting a user of a computer system.

34. The method as recited in claim 32, wherein the output indication is provided in a form suitable to be used by an automatic procedure, such as anti-virus software.

* * * * *